United States Patent [19]
Nitsche

[11] Patent Number: 6,099,286
[45] Date of Patent: Aug. 8, 2000

[54] UNIVERSAL MOLD CARRIER WITH IMPROVED AIR FLOW COMPENSATION

[75] Inventor: Reinhold Ernst Nitsche, Caledonia, Canada

[73] Assignee: Wentworth Mould and Die Company, Hamilton, Canada

[21] Appl. No.: 09/206,300

[22] Filed: Dec. 7, 1998

[30] Foreign Application Priority Data

May 29, 1998 [CA] Canada ................................. 2239192

[51] Int. Cl.$^7$ ................................................. B29C 49/42
[52] U.S. Cl. ................... 425/168; 425/405.1; 425/451.9; 425/532; 425/541
[58] Field of Search .................................. 425/522, 532, 425/541, 168, 405.1, 451.9

[56] References Cited

U.S. PATENT DOCUMENTS

| | | | |
|---|---|---|---|
| 3,782,879 | 1/1974 | Mnilk et al. | 425/541 |
| 4,427,360 | 1/1984 | Albrecht et al. | 425/541 |
| 4,762,486 | 8/1988 | Windstrup et al. | 425/541 |
| 4,938,680 | 7/1990 | Guarriello et al. | 425/522 |
| 5,326,250 | 7/1994 | Doudement | 425/541 |
| 5,411,391 | 5/1995 | Albrecht et al. | 425/522 |
| 5,486,103 | 1/1996 | Meiring et al. | 425/541 |
| 5,599,566 | 2/1997 | Casolari | 425/405.1 |
| 5,700,496 | 12/1997 | Bacon | 425/541 |
| 5,968,560 | 10/1999 | Briere et al. | 425/541 |
| 5,993,721 | 11/1999 | Kurihara et al. | 264/540 |

FOREIGN PATENT DOCUMENTS 2659265  9/1991  France.

*Primary Examiner*—Robert Davis

[57] ABSTRACT

A universal mold carrier for use in a mold assembly compensates for parting forces associated with container formation by directing a compensating air flow pressure to the rear surface of the mold carrier. The mold carrier includes two mold halves adapted to matingly engage each other and hold within the mold carriers interchangeable mold shells. One of the mold carriers has an outside wall that has a plurality of independent air flow compensating surface areas located thereon. This mold carrier further has an air flow communication line interconnecting the independent air flow compensating surface areas. Shut off valves are located in the one carrier to close and to open the air flow communication line between adjacent independent air flow compensating surface areas to allow for adjustment of the compensating pressure. The shut off valves each include a valve stem adapted to open and close the valve thereby connecting or disconnecting the independent air flow compensating surface areas located on opposite sides of the valve. The valve stem is positioned in the carrier along its parting wall which is accessible to an operator when the mold halves are open. The mold half carrier permits an operator to open or close off supply of compensating pressure applied to different compensating systems during a quick change over of the mold shells carried by the mold half carriers.

20 Claims, 5 Drawing Sheets

UNIVERSAL MOLD CARRIER WITH IMPROVED AIR FLOW COMPENSATION

FIELD OF THE INVENTION

The present invention relates to a universal mold carrier adapted for receiving mold shells having different mold configurations and sizes. In particular, the present invention relates to a mold carrier able to provide varying compensation forces dependent on the size of the mold shell cavity so as to maintain the mold shells closed during formation of a container in the cavity between the mold shells.

BACKGROUND OF THE INVENTION

Typical universal mold assemblies for manufacturing plastic containers include two half mold carriers each adapted to carry one half of a mold shell. Each mold shell half is interchangeable with a corresponding mold carrier to allow for different shaped articles to be manufactured by the mold assembly. The mold assembly includes a pair of support arms each supporting a corresponding carrier. The support arms are connected to a pivot point and act as levers to rotate about the pivot point to open and close the mold halves carried by the support arms through the carriers. Various latching and locking mechanisms have been developed to hold the carriers together during the forming operation. To allow for proper alignment of the mold shell during closure of the mold half carriers, one mold half carrier parting wall usually has bushings which mate with pins extending from the parting wall of the other mold half carrier. Mold assemblies of this configuration are described in U.S. Pat. 5,326,250 issued Jul. 5, 1994 to Doudement and published French Patent application Serial No. 2,659,265 published Sept. 17, 1991 assigned to Sidel S. A.

During the formation of the container in the mold shell, pressures as high as 600 pounds per square inch are forced into the cavity of the mold shell causing a plastic preform to expand into a container having a shape defined by the shape of the cavity of the mold shells. This formation pressure pushes the mold shells outwardly against the mold carriers and the supporting arms. Over time, these forces cause partial separation of the mold shells creating a flattened parting line defect on the plastic container or mold formed in the mold cavity.

To compensate for parting of the mold shell halves during mold formation, the aforementioned French patent application 2,659,265 has a single compensating surface area located on the outer surfaces of one of the mold half carriers. An air inlet orifice is contained in one of the support arms to direct air into this compensating surface area. The compensating surface area is approximately 15% greater than the surface area of the mold shell cavity. The compensating surface area is bounded by a continuous rectangular groove in which an O-ring is positioned to seal the periphery of the compensating surface area with an inside wall of the corresponding one support arm. The one support arm engaging the compensating surface area includes an air passageway communicating with the compensating surface area so that a compensating air pressure is forced evenly over the compensating surface area of this mold half carrier. This compensating air flow pressure pushes the mold carrier half against the expansion force associated with the air pressure being exerted outwardly from the mold cavity during container formation. As a result, the mold parts do not open during formation reducing or eliminating the formation of a parting line defect on the container.

The above described mold assemblies however do not provide for varying levels of air flow compensation pressure for different sizes of mold shell cavities. The counter pressure to the outside surface of the mold carrier should vary to accommodate for varying sizes of containers formed in the mold cavity. Compensating systems have been developed to address this problem by having multiple compensation surface areas located on the outside face of one of the carriers. Different air feeder lines are connected to the mold half carrier to supply pressurized air through the mold carrier to different groupings of the multiple compensation surface areas. That is a first feeder line passes to and through the carrier directly to one of the compensating areas while second and third feeder lines pass to and through the carrier to two other compensating areas. Control of air through the three feeder lines is located upstream of the carrier. The disadvantage with this multiple surface area air compensating system is that it requires the external or remote location of air flow controls having to be retrofitted to existing machines.

Accordingly there is a need to provide a multiple air flow compensating system for use in an universal mold carrier that does not require retrofitting of the air supplies to the mold and can be readily adjusted by an operator facing the molds during a quick change over of the mold.

SUMMARY OF THE INVENTION

The present invention relates to a universal mold carrier for compensating air flow pressure during mold container formation. The mold carrier comprises two mold halves adapted to matingly engage each other and hold within the mold carriers interchangeable mold shells. One of the mold carriers has an outside wall that has a plurality of independent air flow compensating surface areas located thereon. This mold carrier further has an air flow communication line interconnecting the independent air flow compensating surface areas and includes shut off valves located in the carrier for controlling air flow between adjacent independent air flow compensating surface areas. The shut off valves include an actuator adapted to open and close the valve thereby connecting or disconnecting the independent air flow compensating surface areas located on opposite sides of the valve. The valve actuator is positioned in the carrier at a location which is accessible to an operator when the mold halves are open. Accordingly, the mold half carrier of the present invention permits for an adjustment of the compensating pressure applied to mold shells of differing cavity size during formation of a container in the cavity where the adjustment is readily accessible to an operator during a quick change over of the mold shells carried by the mold half carriers.

In accordance with one aspect of the present invention there is provided a mold half carrier for use in a mold assembly having air flow compensation. The mold half carrier includes a rear face including at least first and second independent air flow compensating systems contained therein and an air flow communication passage located in the one carrier extending between the first compensating system and the second compensating system. The mold half carrier has a shut off valve for controlling air flow through the air flow communication passage to control flow of pressurized air into the second compensating system.

The mold half carrier is removeably secured to one support arm of the mold. The support arm engages a rear face of the carrier. The support arm includes an air feeder passage for delivering pressurized air into the first air compensating system.

The mold half carrier preferably further includes parting line surfaces and the shut off valve includes a valve control stem accessible from one parting line surface of the carrier. Preferably each of the air flow compensating systems comprises a generally rectangular surface area bounded by a single continuous groove. An O-ring is carried by the single continuous groove to seal the rectangular surface area against the support arm. Preferably, it is the diameter of the compressed O-ring together with the air flow compensating surface area wall and corresponding support arm wall that defines the volume of the air flow compensation system.

In accordance with another aspect of the present invention there is provided a mold assembly comprising two mold half shells defining a cavity whose shape corresponds to side walls of a container to be formed in the assembly. The assembly has two mold half carriers each having a corresponding one of the mold half shells releasably secured thereto. The two mold half carriers are moveable between an open position allowing access to the mold half shells and a closed position for formation of the container within the cavity. At least one of the mold half carriers has a rear face including at least one upstream and one downstream independent air flow compensating systems contained thereon. The assembly includes an air flow supply for supplying pressurized air to the first upstream compensating system to provide a compensating pressure to the mold shells during mold formation. An air flow communication passage is located in the one carrier extending between the upstream and downstream compensating systems to communicate pressurized air from the upstream compensating system to the downstream compensating system. A shut off valve is located in the one carrier between adjacent air flow compensating systems for controlling air flow through the air flow communication passage to enable and inhibit flow of pressurized air into a downstream compensating system.

The shut off valve preferably has a stem that threadibly engages a valve seat extending into the one carrier from a parting line surface of the carrier. Rotation of the stem moves the head of the valve into and out of the air flow communication passage respectively to close and open the air flow communication passage. The valve head preferably has a shoulder for supporting an O-ring that seals the air from escaping to atmosphere along the stem of the valve. The shut off valve preferably includes a locking or set screw threaded into the parting line surface of the carrier adjacent to the valve stem such that the head of the set screw is recessed in the one carrier and overlaps the valve stem to prevent the stem from loosening during repeated mold formation operations.

By providing such an arrangement advantage is found in that the valves form part of one of the mold carriers and are easily accessible to an operator who has to adjust these valves during insertion of a new shell into the mold carrier. Further, it does not require retrofitting of any equipment of the operator that is external to the mold carrier.

For a better understanding of the nature and objects of the present invention reference may be had by way of example to the accompanying diagrammatic drawings.

BRIEF DESCRIPTION OF THE DRAWINGS

A more complete understanding of the apparatus of the present invention may be obtained by reference to the following detailed description when taken in conjunction with the accompanying diagrammatic drawings wherein.

DETAILED DESCRIPTION OF THE PREFERRED EMBODIMENTS

Figure 1:
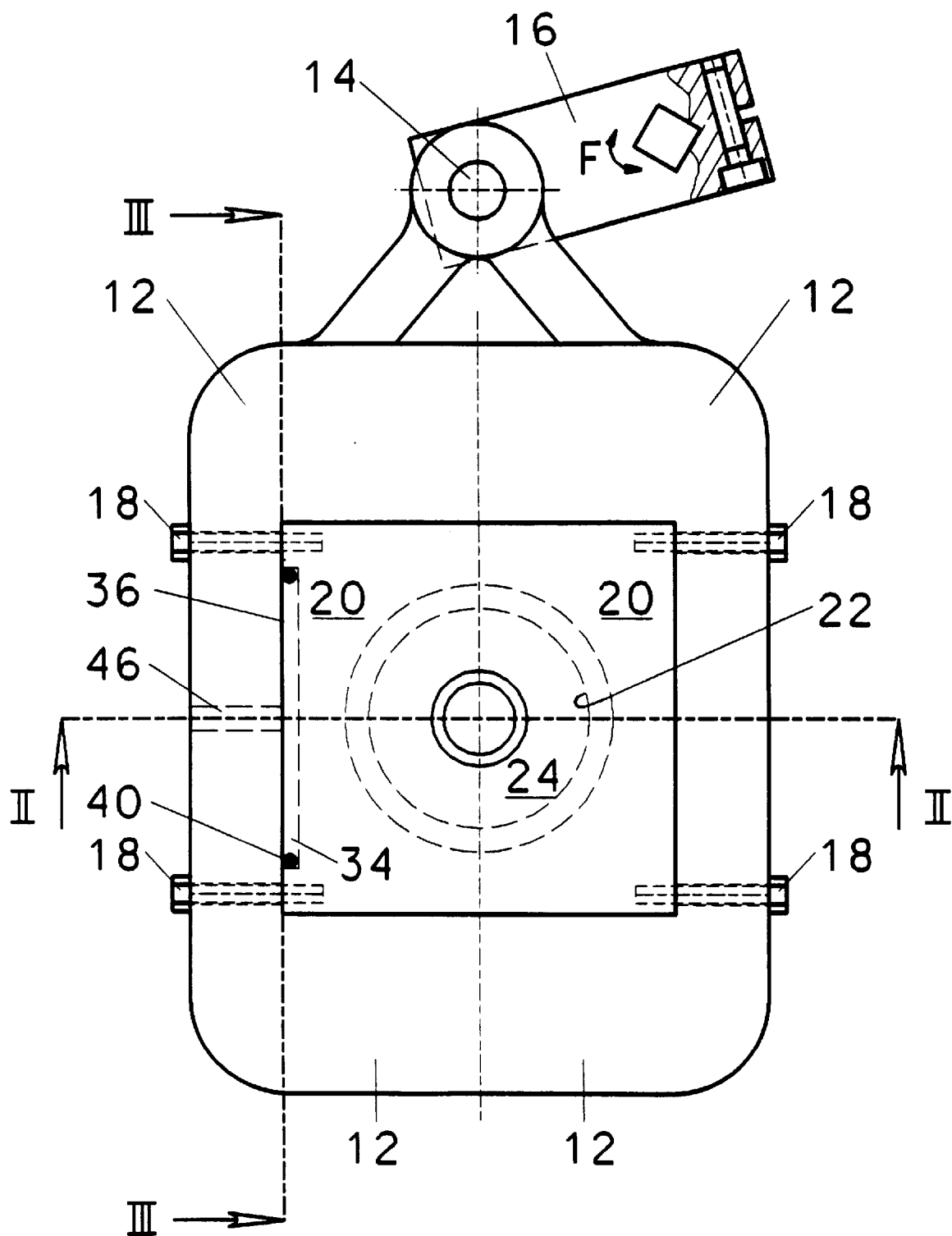
FIG. 1 is plan view of the mold assembly.
Figure 2:
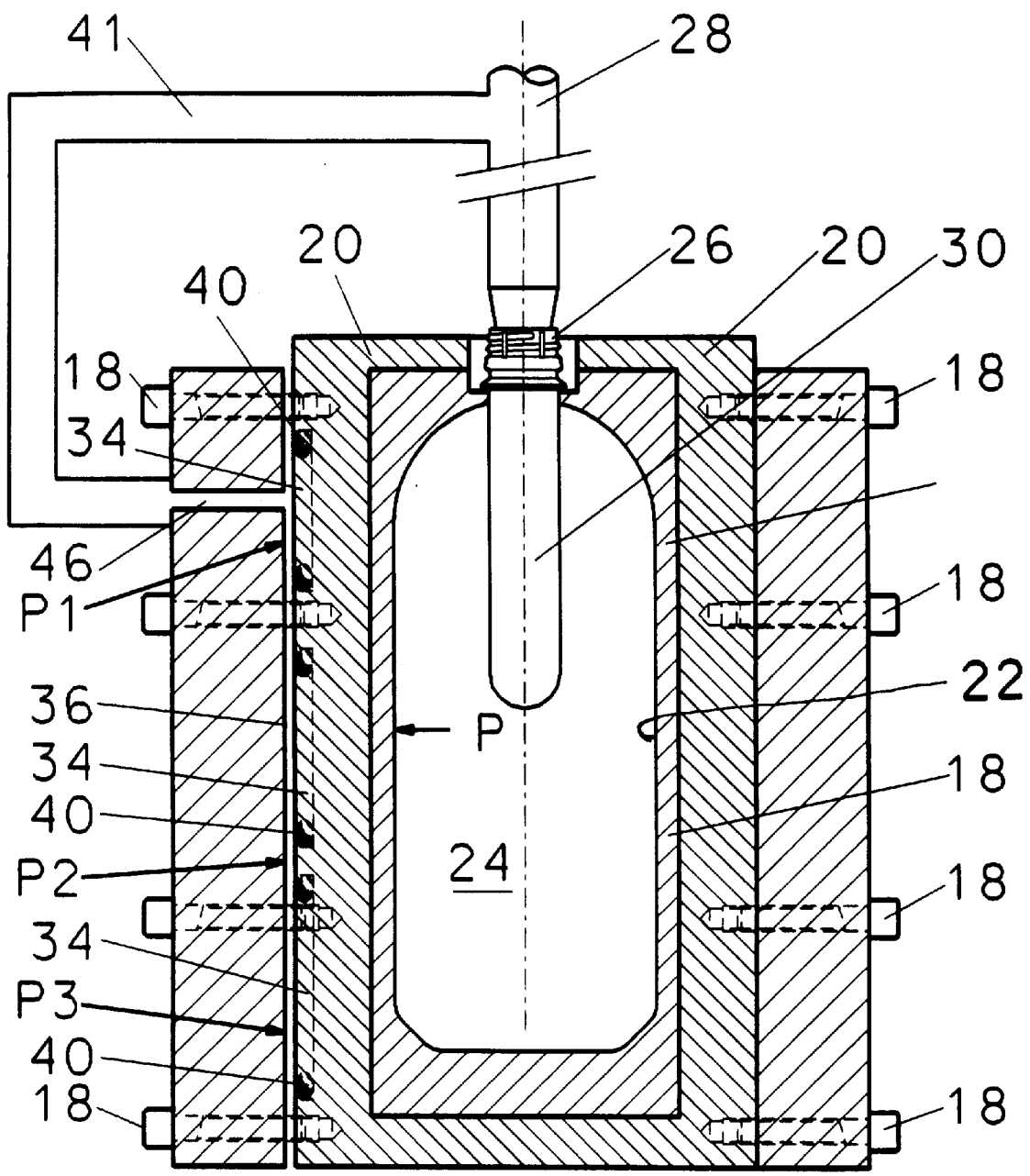
FIG. 2 is a side sectional view of the mold assembly as seen at lines II—II of FIG. 1.

Referring to the drawings the preferred embodiment of the present invention is described. In FIGS. 1 and 2, the mold assembly 10 includes a pair of support arms 12 which pivot about pivot pin or axis 14. A lever arm 16 causes the support arms 12 to pivot about axis 14 to move the support arms 12 into the closed position shown. The support arms 12 support, through threaded bolts 18 two mold half carriers 20. The mold half carriers 20 each carry one sidewall half of a mold shell 22. In the closed position shown, mold shells 22 define a cavity 24 whose shape determines the shape of the container formed in the cavity. During container formation, the support arms 12 hold the mold half carriers 20 and shells 22 in the closed position shown. Pressurized air is blown into the mold causing preform 30 to expand into the cavity. Later in the formation, the support arms 12 are pivoted about axis 14 to separate the carriers 20 and shells 22 to permit removal of the formed container. It should be understood that a mold base carrying a base shell defining the shape of the container base has not been shown in this preferred embodiment.

The attachment of the mold shells 22 to the mold half carriers 20 by means of quick change screws and latches is known in the art and has not been shown in the drawings. However, it should be understood that while the mold shell halves 22 shown in FIG. 2 define a cavity that extends vertically along the carriers 20. In some instances the shell 22 extends only a partial distance down from the top of the mold assembly such as, for example, one-third or one-half the distance. While the mold shell 22 can extend at various lengths, the mold carriers halves 20 extend the entire height of the jig assembly and co-extend with the support arms 12 in the preferred embodiment.

Passing through the top of the mold assembly 10 between the mold half carriers 20 is the neck 26 of the air inlet passage 28. Pressurized air is fed through neck 26 to the plastic preform 30 contained in the cavity 24 between the mold shell halves 22. This causes the preform 30 to expand to the shape of the inside walls of cavity 24 to form a container. During mold formation, an outwardly directed pressure "p" is exerted against the mold shells 22. This pressure "p" is transferred to the mold half carriers 20 and the support arms 12 tending to open the support arms 12. While the support arms 12 are typically latched together (not shown) to prevent premature opening of the support arms 12, repeated mold forming operations tend to cause these support arms 12 to open by as little as a few thousands of an inch. This causes parting of the mold carrier halves 20 and the mold shell halves 22. As a consequence, the plastic of the preform flows into the crevice created between the mold shells 22 causing a parting line to be visible along an outside surface of the container formed in the mold assembly 10.

To overcome this parting line problem and to accommodate for mold shell cavities of varying size, height and shape, the present invention provides for varying compensating air pressures of $P_1$, $P_1+P_2$, or $P_1+P_2+P_3$ that counteract the injection air pressure that is forced outwardly as shown by pressure "p". The air compensating pressures $P_1$, $P_2$ and $P_3$ are achieved by one mold carrier half 20 having three compensating surface areas 34. These surface areas 34 are shown in FIG. 1 to 5 to be located on a rear face 36 of one carrier 20. The surface areas 34 are independent of each other along the rear face 36 and are bounded by a generally rectangular single continuous groove 38 cut into the rear face 36. The corners of the grooves 38 are rounded so that the grooves 38 are better adapted to receive O-rings 40. The O-rings 40 prevent pressurized air entering each surface area 34 from moving between adjacent surface areas 34 when the support arm 12 is secured to the rear face 36 of the mold half carrier 20. The surface areas 34 each cover approximately the same surface area with the uppermost surface are 34 covering a slightly larger area. It should be understood that the preferred embodiment shows three compensating surface areas 34 and that alternatively, two, or four or more, compensating surface areas are also within the realm of the present invention.

Pressurized air is fed to the upper most compensating surface area 32 through the corresponding support arm 12. The support arm 12 includes a feeder line air inlet passage 46 that communicates air from bleed off inlet line 41. In the preferred embodiment shown, there is no shut off associated with the supply of pressurized air to the uppermost compensating system 34. Consequently a compensating air pressure $P_1$ is continuously present at the upper most compensating area 34 during mold formation.

Each of the air flow compensating areas 34 includes a vent opening 42 in the rear surface of the one carrier 20. The vent openings 42 are connected to each other in a series manner by an air flow communication passage 44 extending through the carrier 20. When pressurized air is permitted to flow along passageway 44, air from the uppermost compensating area 34 flows out its corresponding vent opening 42 along passageway 44 and into the middle and lower most compensation areas 34 through their corresponding vent openings 42. This results in additional air flow compensating pressures $P_2$ and $P_3$ respectively present in the middle and lower most compensating areas 34.

Figure 3:
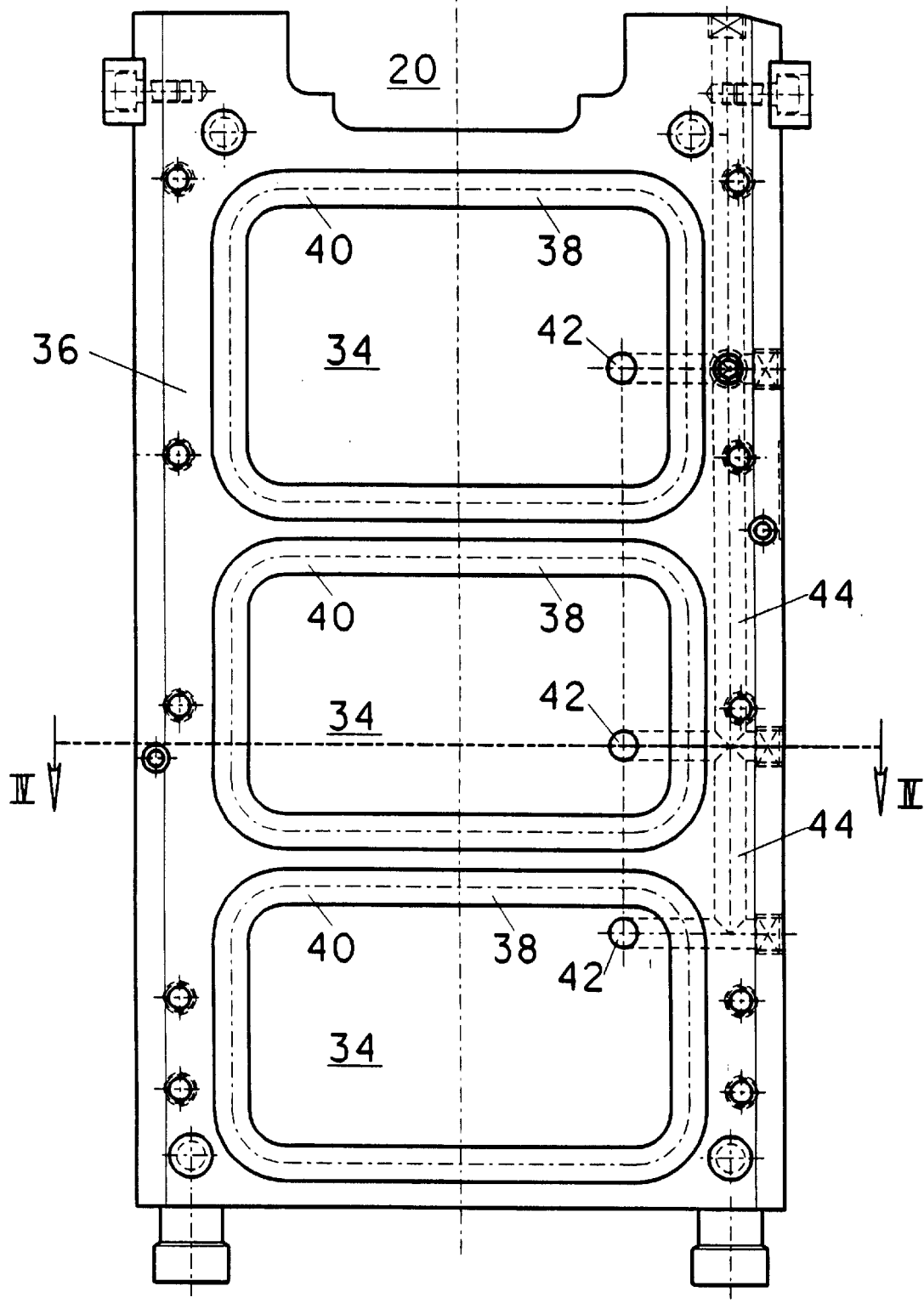
FIG. 3 is a back view showing the rear surface of one of the mold half carriers of the present invention as seen at lines III—III of FIG. 1.
Figure 4:
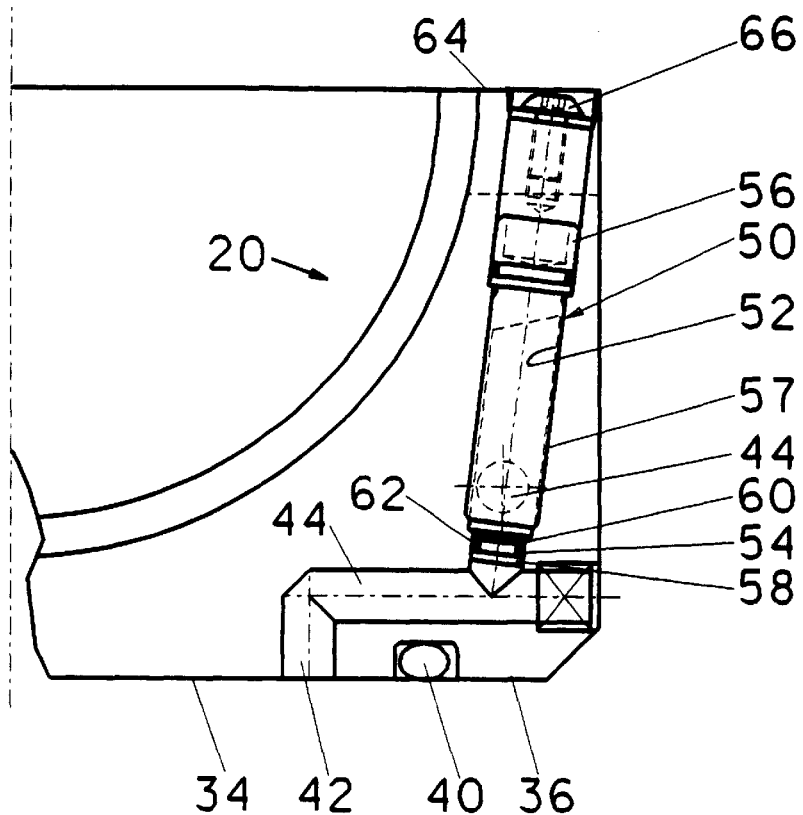
FIG. 4 is a section of the one mold half carrier of the present invention as seen at line IV—IV of FIG. 3 showing the shut off valve in the closed position.
Figure 5:
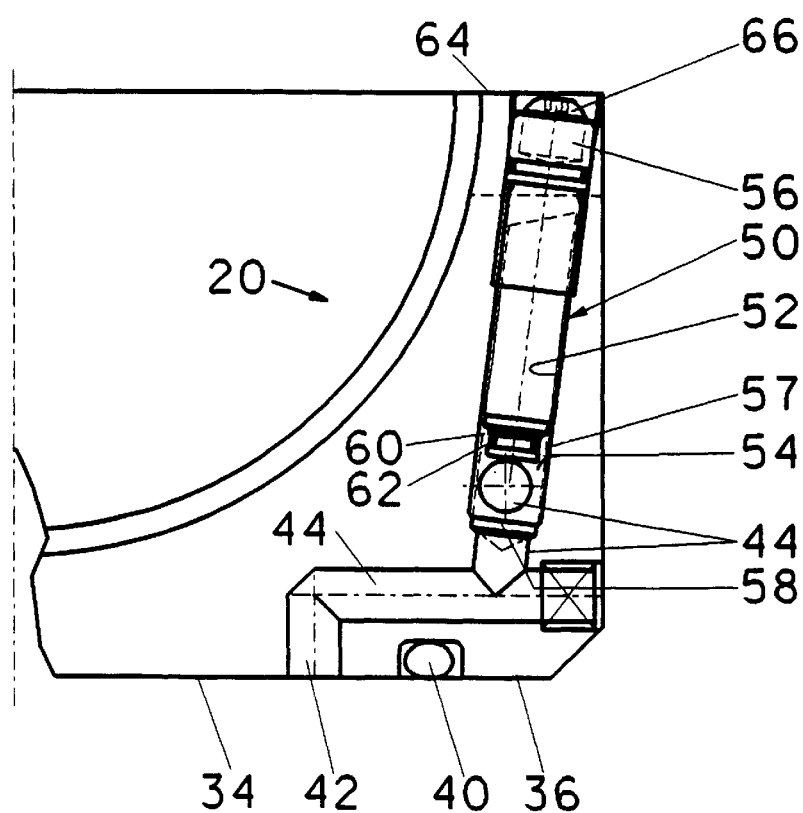
FIG. 5 is a section of the one mold half carrier of the present invention as seen at line IV—IV of FIG. 3 showing the shut off valve in the open position; and, FIG. 6 is a front view of the mold half carrier of the present invention as seen from lines V—V of FIG. 1.
Figure 6:
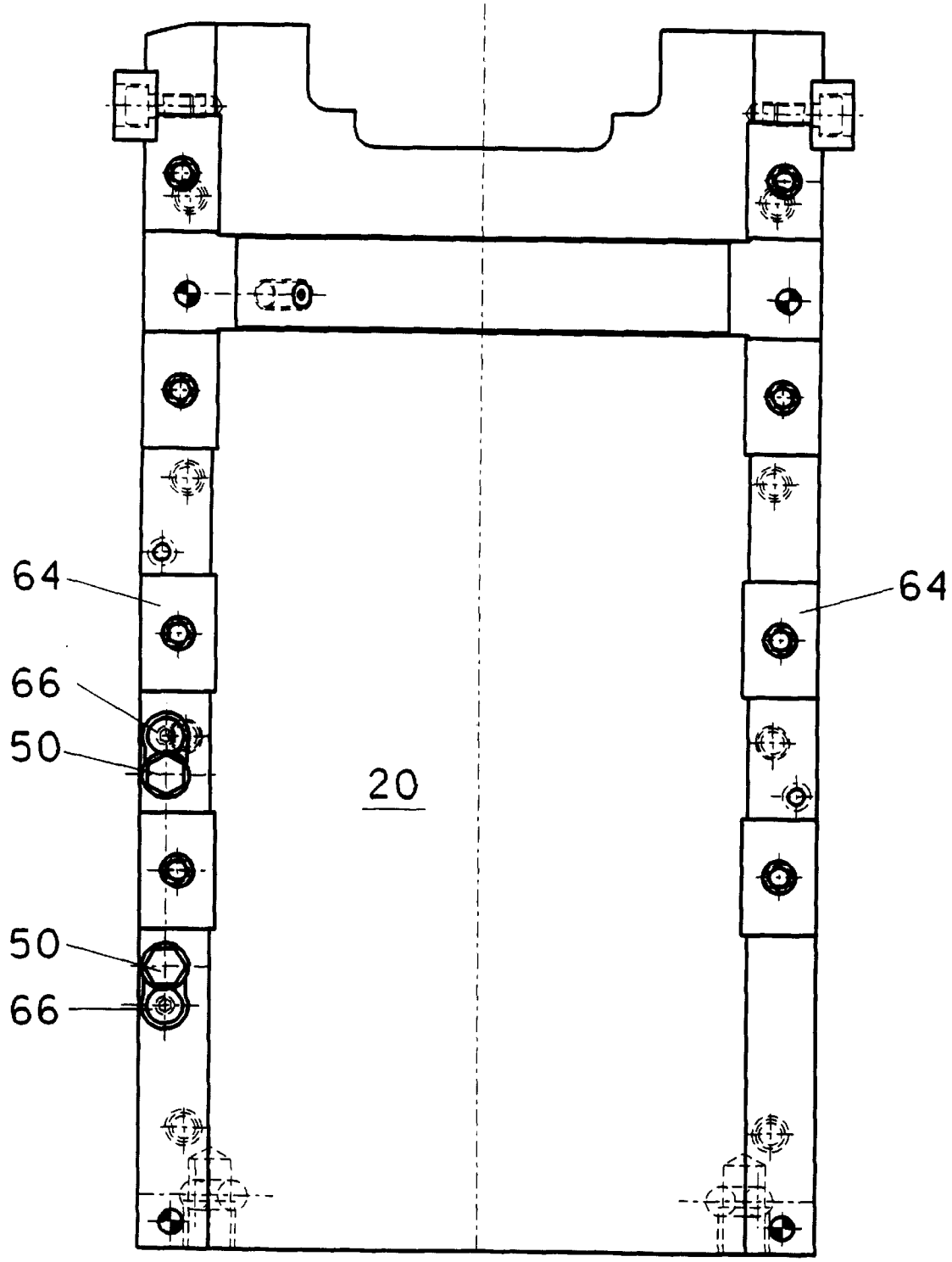

In accordance with the present invention, shut off valves 50 are shown in FIGS. 3 to 5 for controlling air flow through the air flow communication passage 44 so as to regulate the cumulative compensating pressures $P_1$, $P_2$ and $P_3$. In FIG. 5, a first alternative is to have the upper most valve 50 closed to shut off compensating airflow into the middle and lower compensating air surface areas 34. This would be the set up used by an operator when smaller mold shell cavities are used in the mold assembly. A second alternative is to have the upper valve 50 open and the lower valve 50 closed permitting air flow into the upper and middle compensating areas resulting in a compensating air flow pressure of $P_1+P_2$. A third alternative is to have both upper and lower valves 50 open permitting unrestricted air flow along passageway 44 into the middle and lower most compensating areas 34 from the uppermost compensating area 34. This results in an air flow compensating pressure equal to $P_1+P_2+P_3$.

Referring to FIGS. 3 and 4, one of the valves 50 is shown respectively in its closed and open positions. In the closed or shut off position of FIG. 3, air flow along passageway 44 is inhibited. In the open position of FIG. 4, air flow along passageway 44 is unrestricted.

The valve 50 includes a threaded valve stem 52 having a sealing head portion 54. The valve 50 further includes an Alan Key adjustable head 56 which is recessed within a threaded bore 57 in the mold half carrier 20. The threaded bore 57 has a seat 58 into which the head portion 54 of the stem 52 is inserted. The head portion 54 has a shoulder 60 with an O-ring 62 surrounding it to seal the valve stem from leaking air to atmosphere along the stem 52. The shut off valve 50 extends into the carrier 20 along one of the two parting surfaces 64 of the carrier 20. The parting surfaces 64 of each of the carriers 20 are adapted to engage each other in aligned contact when the mold half carriers are in a closed position.

The control valve 50 further includes a set screw 66 threaded into the parting line surface 64 adjacent the valve stem 52 such that the head of the set screw 66 is recessed in the carrier 20 and overlaps the stem adjustment head portion 56 to prevent the stem 52 from loosening during repeated mold formation operations.

While not shown in the drawings, one of the mold half carriers 20 typically includes pins on its parting line surfaces 64 which matingly engage bushings located on the parting line surfaces of the other carrier 20.

What is claimed is:

1. A mold half carrier for use in a mold assembly having air flow compensation, the mold half carrier including:
   a rear face including at least first and second independent air flow compensating systems contained therein,
   an air flow communication passage located in the mold half carrier extending between the first compensating system and the second compensating system; and,
   a shut off valve located in the carrier for controlling air flow through the air flow communication passage to control flow of pressurized air into the second compensating system.

2. The mold half carrier of claim 1 further adapted to be secured to a support arm covering the rear face and the first and second air compensating systems, and the support arm including an air flow feeder passage for delivering pressurized air into said first air compensating system.

3. The mold half carrier of claim 2 wherein each of the air flow compensating systems comprises an air flow compensating surface area located on the rear face.

4. The mold half carrier of claim 2 wherein each air flow compensating area is bounded by a single continuous groove.

5. The mold half carrier of claim 4 wherein the single continuous groove has a generally rectangular shape.

6. The mold half carrier of claim 5 wherein an O-ring is carried by the single continuous groove to seal against the support arm.

7. The mold half carrier of claim 1 wherein the mold half carrier includes two relatively flat parting line surfaces, one of the parting surfaces having at least one threaded bore extending from the parting line surface through the one carrier and to a valve seat in the air flow communication passage between the first and second independent air flow compensating systems, and the shut off valve comprises a stem having a threaded portion and a sealing head portion, the threaded portion of the stem being threadably engaged in the threaded bore to advance and to retract the sealing head portion to respectively open and close the air flow communication passage enabling and inhibiting flow of pressurized air into the second compensating system.

8. The mold half carrier of claim 7 wherein the sealing head of the valve stem preferably has a shoulder for supporting an O-ring for sealing the escape of pressurized air along the stem to atmosphere.

9. The mold half carrier of claim 7 wherein the shut off valve further includes a set screw threaded into the parting line surface adjacent the valve stem such that the head of the set screw is recessed in the carrier and overlaps the valve stem to prevent the stem from loosening during repeated mold formation operations.

10. A mold assembly comprising:
two mold half shells defining a cavity whose shape corresponds to side walls of a container to be formed in the assembly;
two mold half carriers each having a corresponding one of the mold half shells releasibly secured thereto, the two mold half carriers being moveable between an open position allowing access to the mold half shells and a closed position for formation of the container within the cavity, at least one of the mold half carriers having a rear face including at least one upstream and one downstream independent air flow compensating systems contained therein;
an air flow supply for supplying pressurized air to the first upstream compensating system to provide a compensating pressure to the mold shells during mold formation;
an air flow communication passage located in the one carrier extending between adjacent air pressure compensating systems to communicate pressurized air from the upstream air pressure compensating system to the adjacent downstream air compensating system; and
a shut off valve located in the one carrier between adjacent air flow upstream and downstream compensating systems for controlling air flow through the air flow communication passage to enable and inhibit flow of pressurized air into the downstream compensating system.

11. The mold assembly of claim 10 wherein the mold half carriers include parting line surfaces along which the mold halves are aligned when in the closed position, and the shut off valve including a valve control stem accessible from one parting line surface of the one carrier when the carriers are in the open position.

12. The mold assembly of claim 10 wherein each mold half carrier is supported by a support arm, one of the support arm supporting the one mold half carrier covering the rear face and the first and second air compensating systems, the one support arm including an air flow feeder passage for delivery of pressurized air into the first air compensating system.

13. The mold assembly of claim 12 wherein each of the upstream and downstream independent air flow compensating systems comprises an air flow compensating surface area located on the rear face.

14. The mold assembly of claim 13 wherein each air flow compensating area is bounded by a first continuous groove.

15. The mold assembly of claim 14 wherein the single continuous groove has a generally rectangular shape.

16. The mold assembly of claim 15 wherein an O-ring is carried by the single continuous groove to seal against the one support arm.

17. The mold assembly of claim 11 wherein the support arms for supporting the mold half carriers, are pivotally movable relative to each other about a common pivoting axis.

18. The mold assembly of claim 10 wherein the mold half carriers each include two relatively flat parting line surfaces such that opposing parting line surfaces of the mold half carriers are adapted to engage each other in aligned contact when the mold half carriers are in the closed position, one of the parting surfaces of the one mold having at least one threaded bore extending from the parting line surface through the one carrier and into a valve seat in the air flow communication passage between adjacent upstream and downstream independent air flow compensating systems, and the shut off valve comprises a stem having a threaded portion and a sealing head portion, the threaded portion of the stem threadably engaging the threaded bore to advance and to retract the sealing head portion to respectively open and close the air flow communication passage.

19. The mold assembly of claim 18 wherein the sealing head of the valve stem has a shoulder for supporting an O-ring for sealing the escape of pressurized air along the valve stem to atmosphere.

20. The mold assembly of claim 18 wherein the shut off valve further includes a set screw threaded into the parting line surface of the one carrier adjacent the valve stem such that the head of the set screw is recessed in the one carrier and overlaps the valve stem to prevent the stem from loosening during repeated mold formation operations.

\* \* \* \* \*